United States Patent
Kim

(10) Patent No.: US 9,880,809 B2
(45) Date of Patent: Jan. 30, 2018

(54) MOBILE TERMINAL AND METHOD FOR CONTROLLING THE SAME

(71) Applicant: LG ELECTRONICS INC., Seoul (KR)

(72) Inventor: Jieun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 319 days.

(21) Appl. No.: 14/647,051

(22) PCT Filed: Dec. 16, 2014

(86) PCT No.: PCT/KR2014/012401
§ 371 (c)(1),
(2) Date: May 22, 2015

(87) PCT Pub. No.: WO2015/194723
PCT Pub. Date: Dec. 23, 2015

(65) Prior Publication Data
US 2016/0259622 A1 Sep. 8, 2016

(30) Foreign Application Priority Data
Jun. 20, 2014 (KR) .................. 10-2014-0075983

(51) Int. Cl.
*G06F 3/048* (2013.01)
*G06F 3/16* (2006.01)
(Continued)

(52) U.S. Cl.
CPC .............. *G06F 3/167* (2013.01); *G06F 3/013* (2013.01); *G06F 3/017* (2013.01); *G06F 3/038* (2013.01);
(Continued)

(58) Field of Classification Search
CPC ...................................................... G06F 3/038
See application file for complete search history.

(56) References Cited

U.S. PATENT DOCUMENTS

2011/0022393 A1 1/2011 Waller et al.
2013/0024197 A1 1/2013 Jang et al.

FOREIGN PATENT DOCUMENTS

EP 2182452 5/2010
EP 2662766 11/2013
(Continued)

OTHER PUBLICATIONS

PCT International Application No. PCT/KR2014/012401, Written Opinion of the International Searching Authority dated Apr. 13, 2015, 4 pages.
(Continued)

*Primary Examiner* — Peiyong Weng
(74) *Attorney, Agent, or Firm* — Lee, Hong, Degerman, Kang & Waimey

(57) ABSTRACT

A mobile terminal and a method for controlling the same are disclosed. The mobile terminal and the method for controlling the same according to the present invention can display content, activate the microphone and receive user voice upon reception of a scroll input, and search for a specific content related to a keyword included in the received user voice from an execution screen of a specific application displayed on the display unit. According to the present invention, it is possible to automatically turn on or off a voice recognition module by grasping intention of a user, thereby reducing battery power while improving user convenience.

17 Claims, 18 Drawing Sheets

(51) Int. Cl.
    *G06F 3/0485* (2013.01)
    *H04M 1/725* (2006.01)
    *G06F 3/01* (2006.01)
    *G06F 3/038* (2013.01)
    *G06F 3/0482* (2013.01)
    *G06F 3/0481* (2013.01)
    *G06F 3/0354* (2013.01)

(52) U.S. Cl.
    CPC .......... *G06F 3/0354* (2013.01); *G06F 3/0482* (2013.01); *G06F 3/0485* (2013.01); *G06F 3/04817* (2013.01); *H04M 1/72522* (2013.01); *G06F 2203/0339* (2013.01); *G06F 2203/0381* (2013.01)

(56) References Cited

FOREIGN PATENT DOCUMENTS

| | | |
|---|---|---|
| JP | 10222337 | 8/1998 |
| JP | 2014-505315 | 2/2014 |
| KR | 10-2010-0076998 | 7/2010 |
| KR | 10-2012-0015186 | 2/2012 |
| KR | 10-2014-0049881 | 4/2014 |
| WO | 2013/012107 | 1/2013 |

OTHER PUBLICATIONS

European Patent Office Application Serial No. 14879274.0, Search Report dated May 20, 2016, 7 pages.

【Figure 1a】
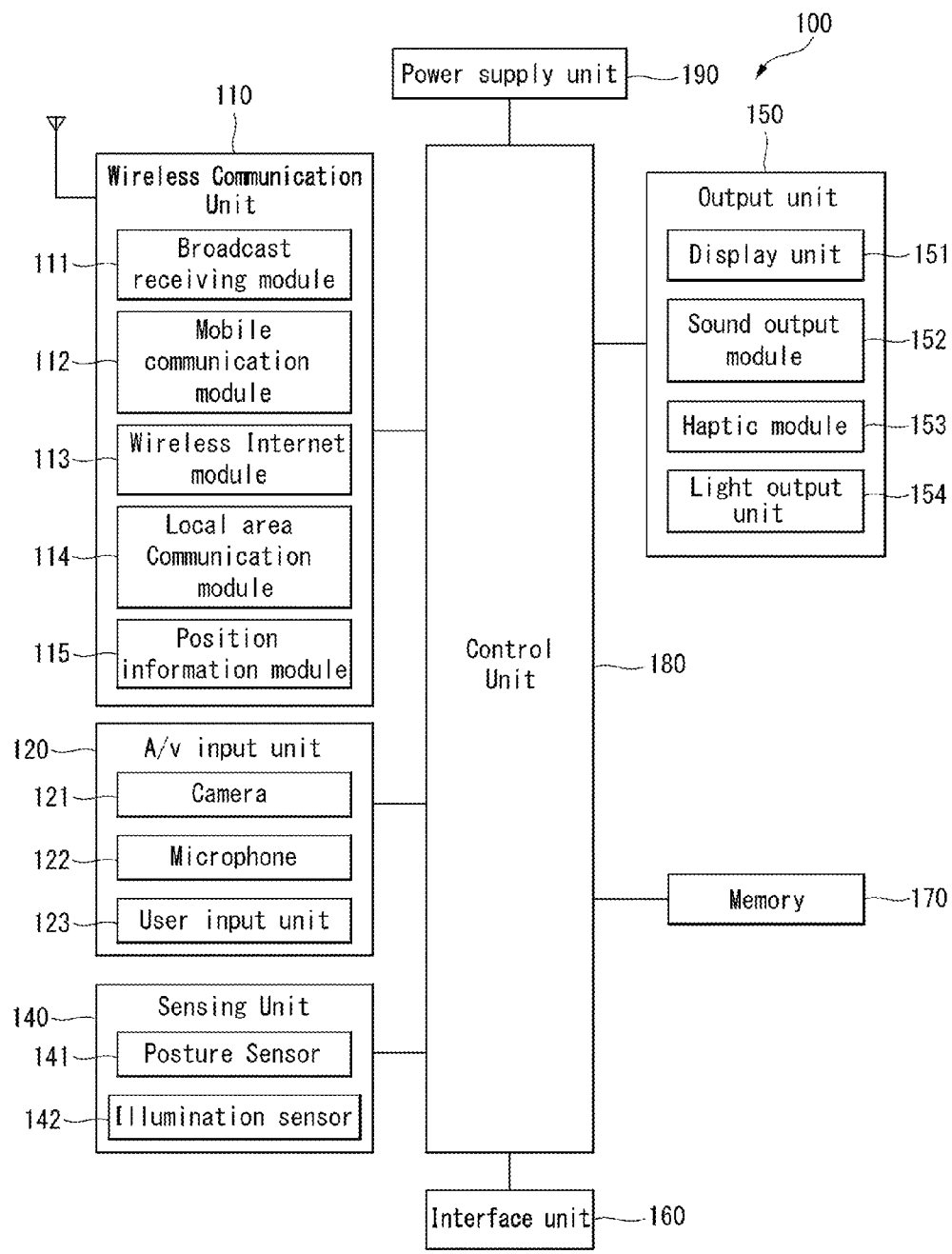

【Figure 1b】
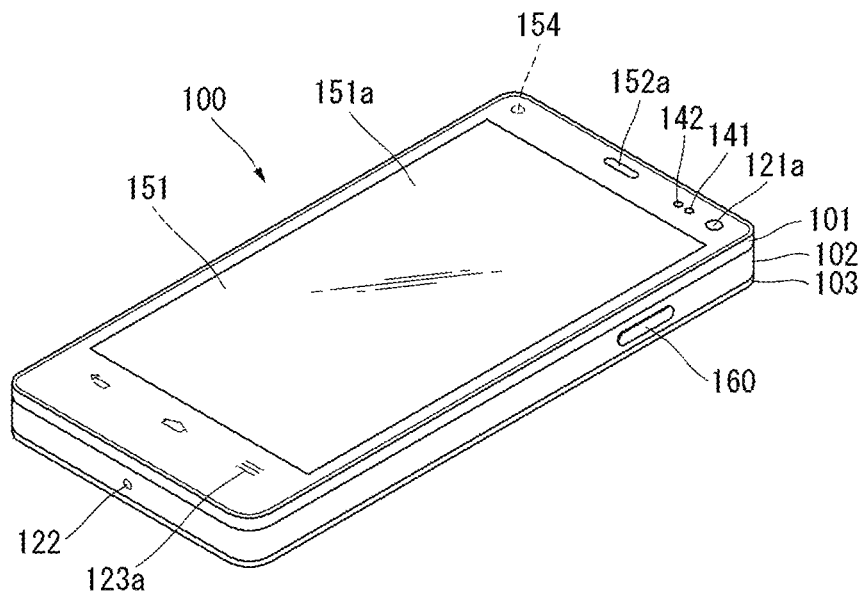
【Figure 1c】
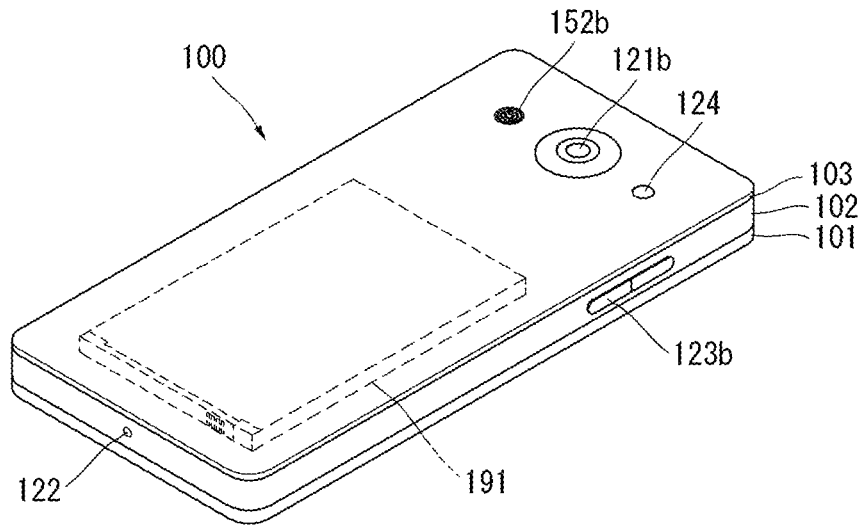

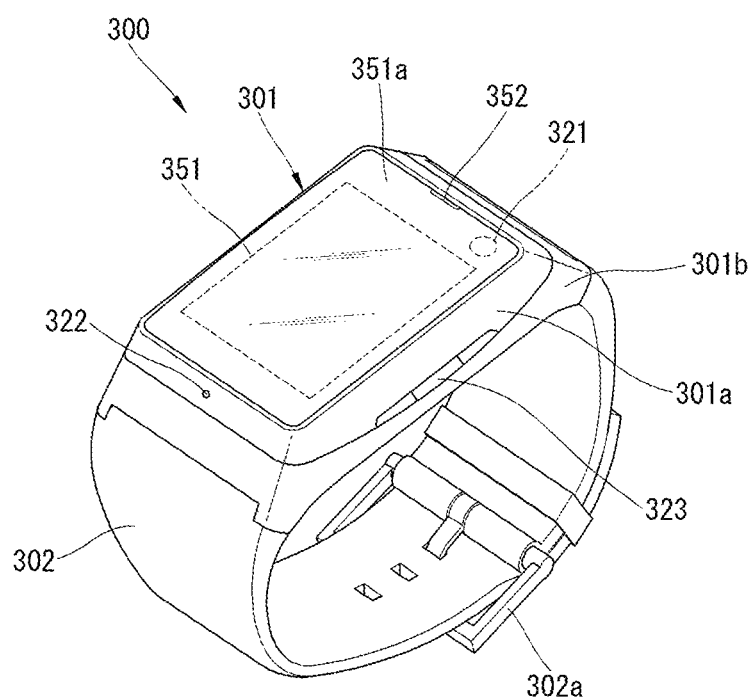
[Figure 2]

【Figure 3】
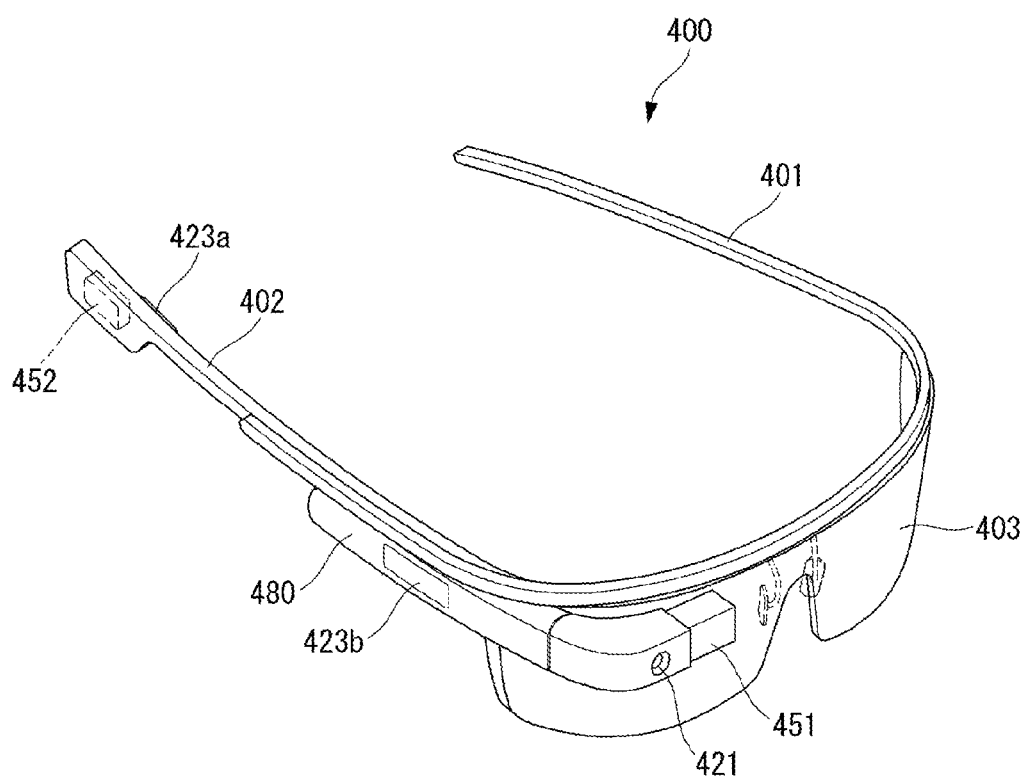

[Figure 4]
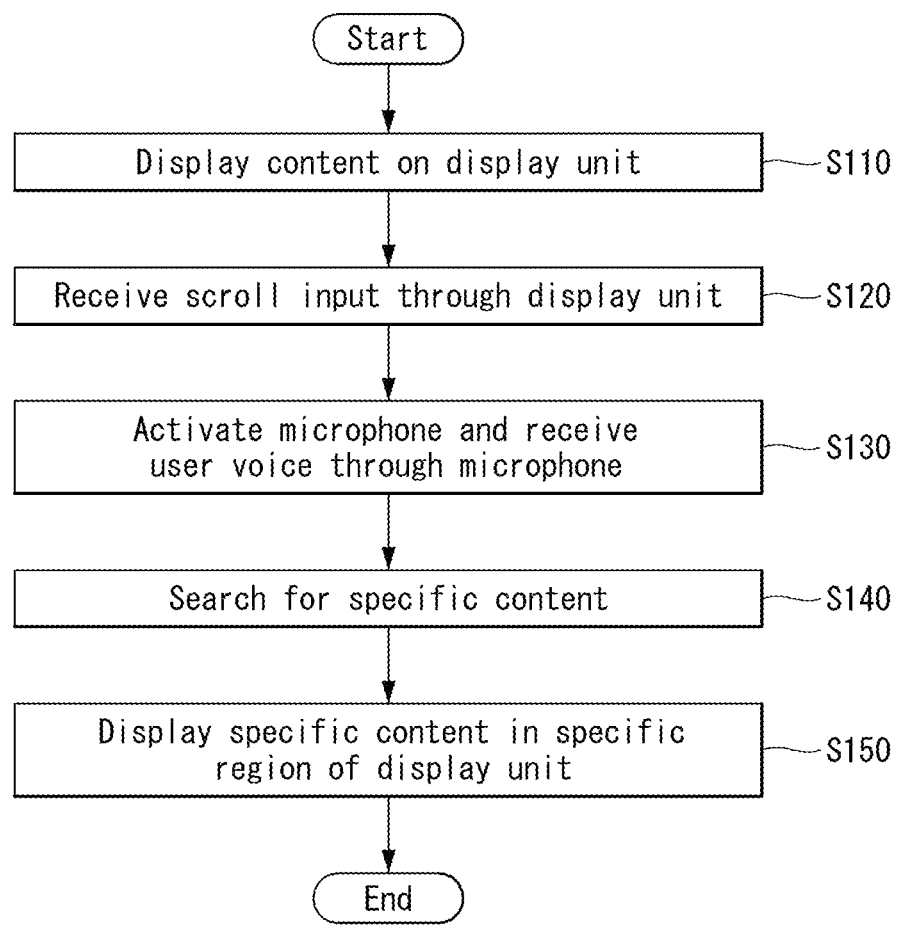

【Figure 5】
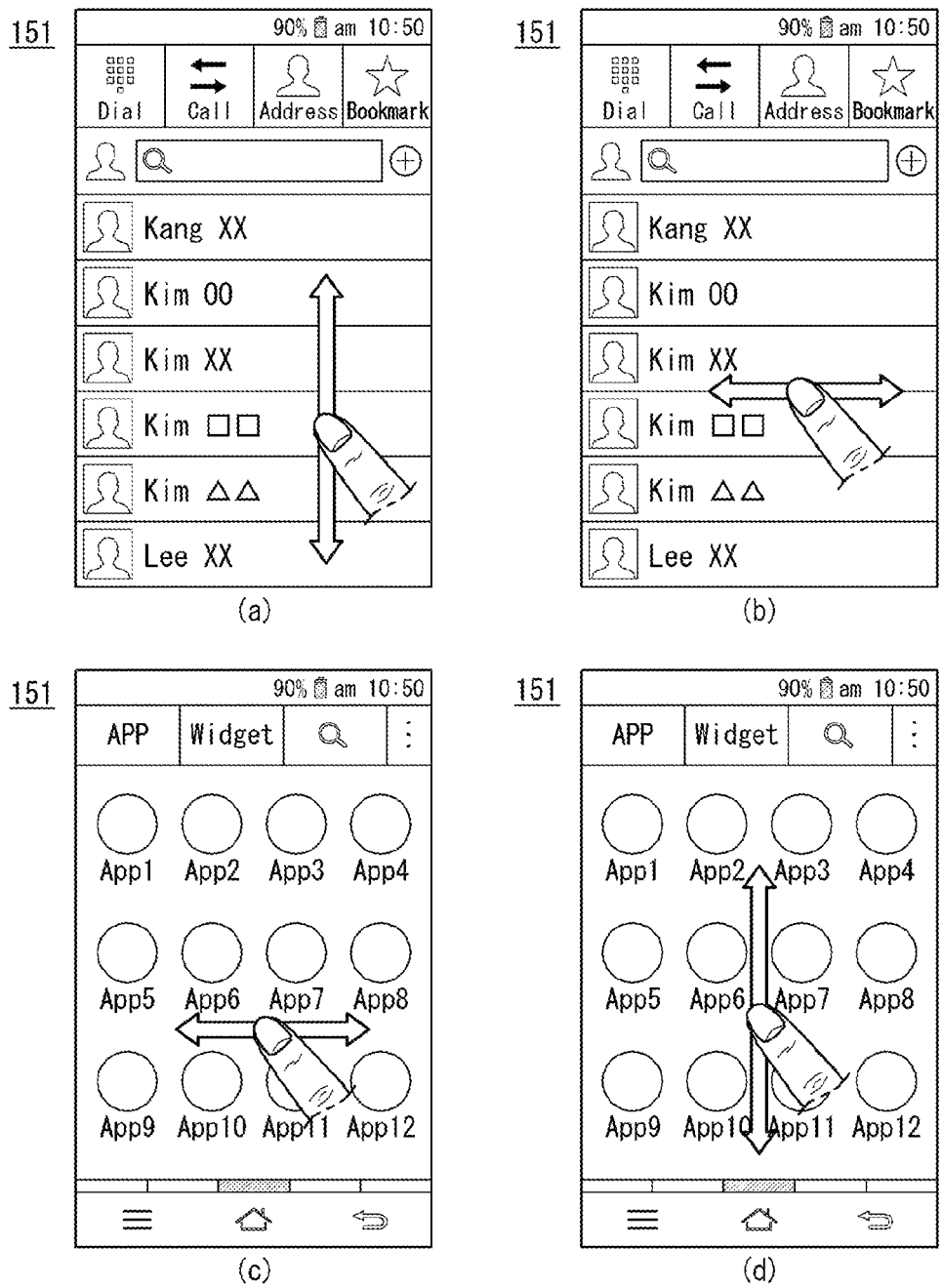

【Figure 6】
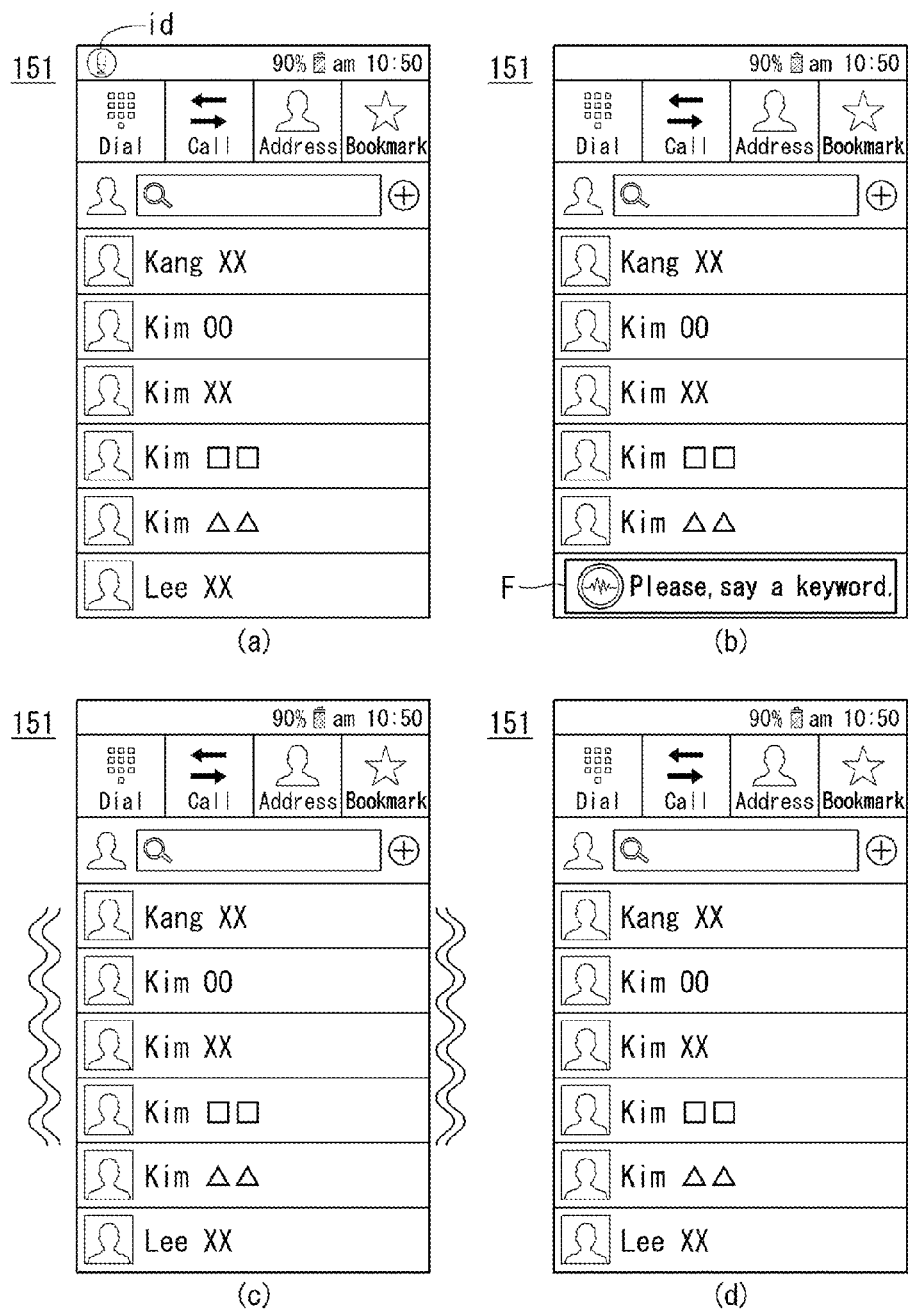

【Figure 7】
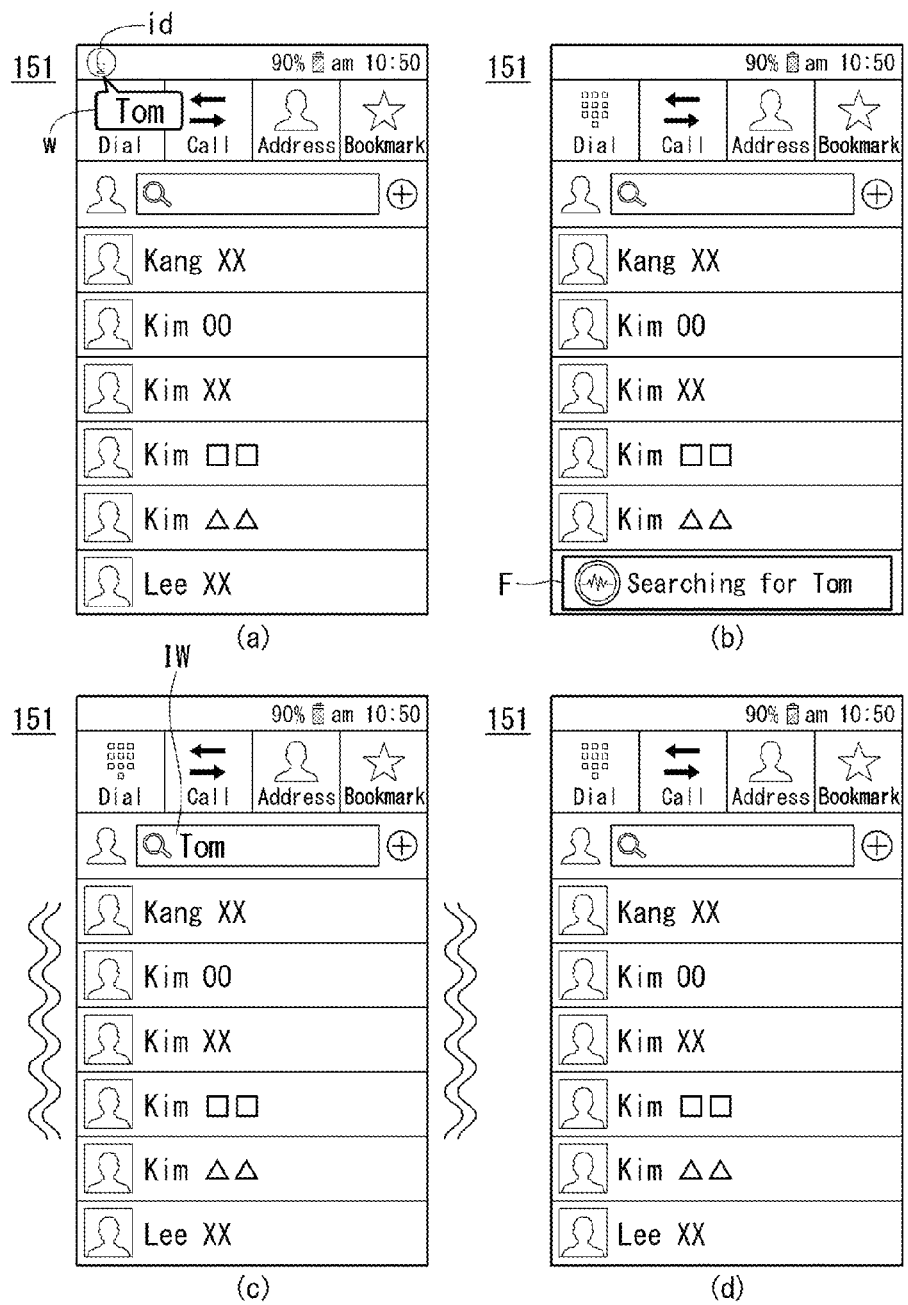

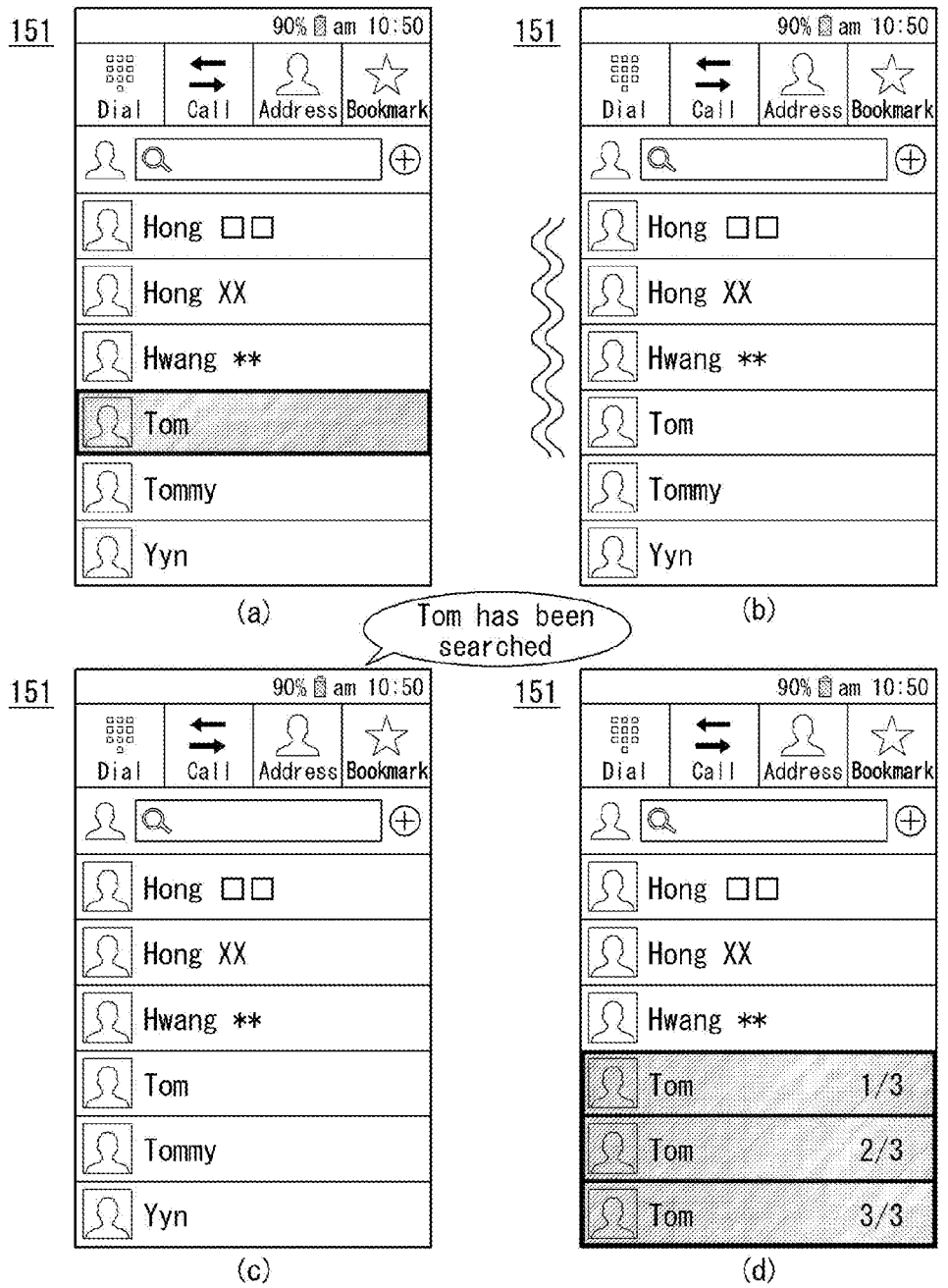
【Figure 8】

【Figure 9】
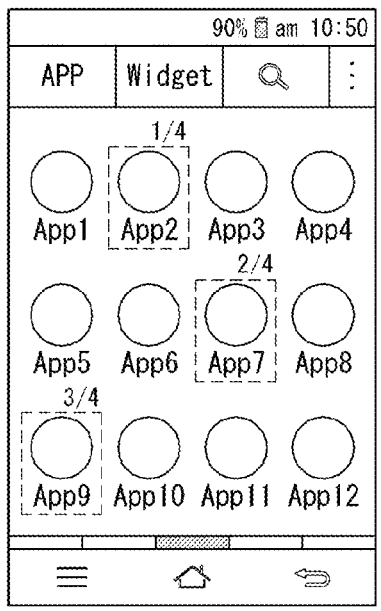
(a)
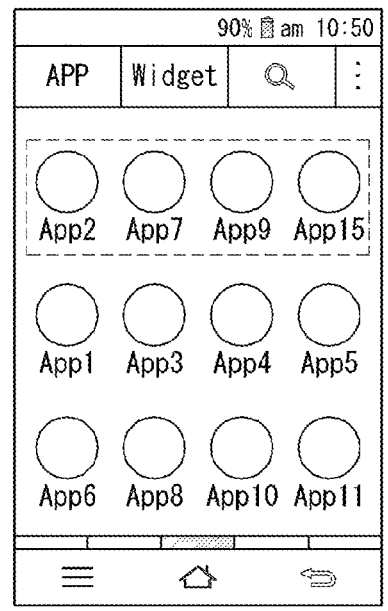
(b)
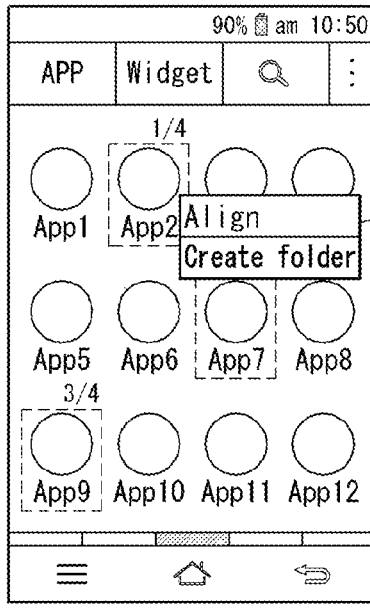
(c)
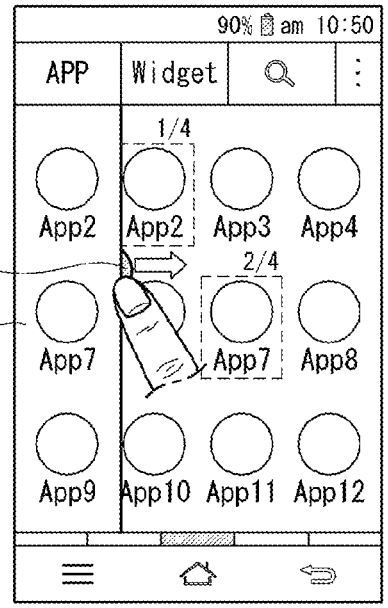
(d)

[Figure 10]
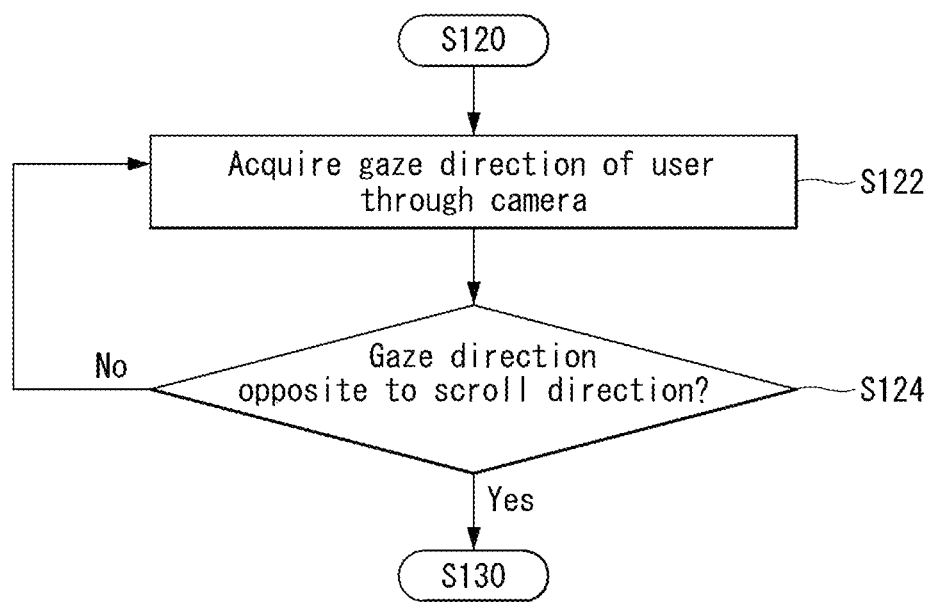

【Figure 11】
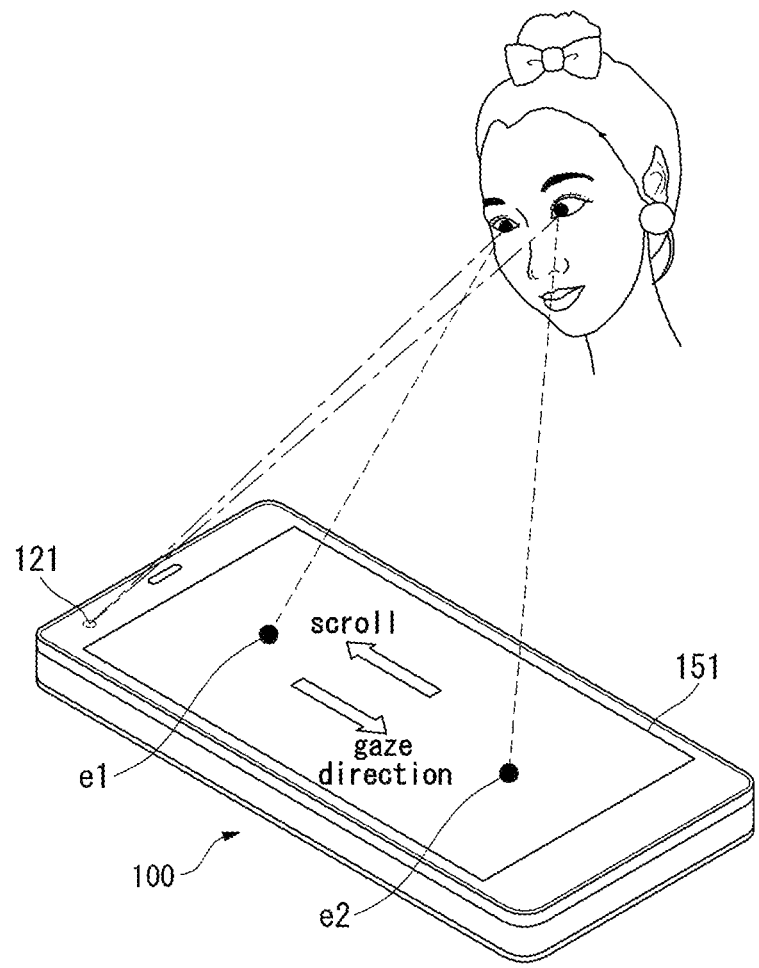

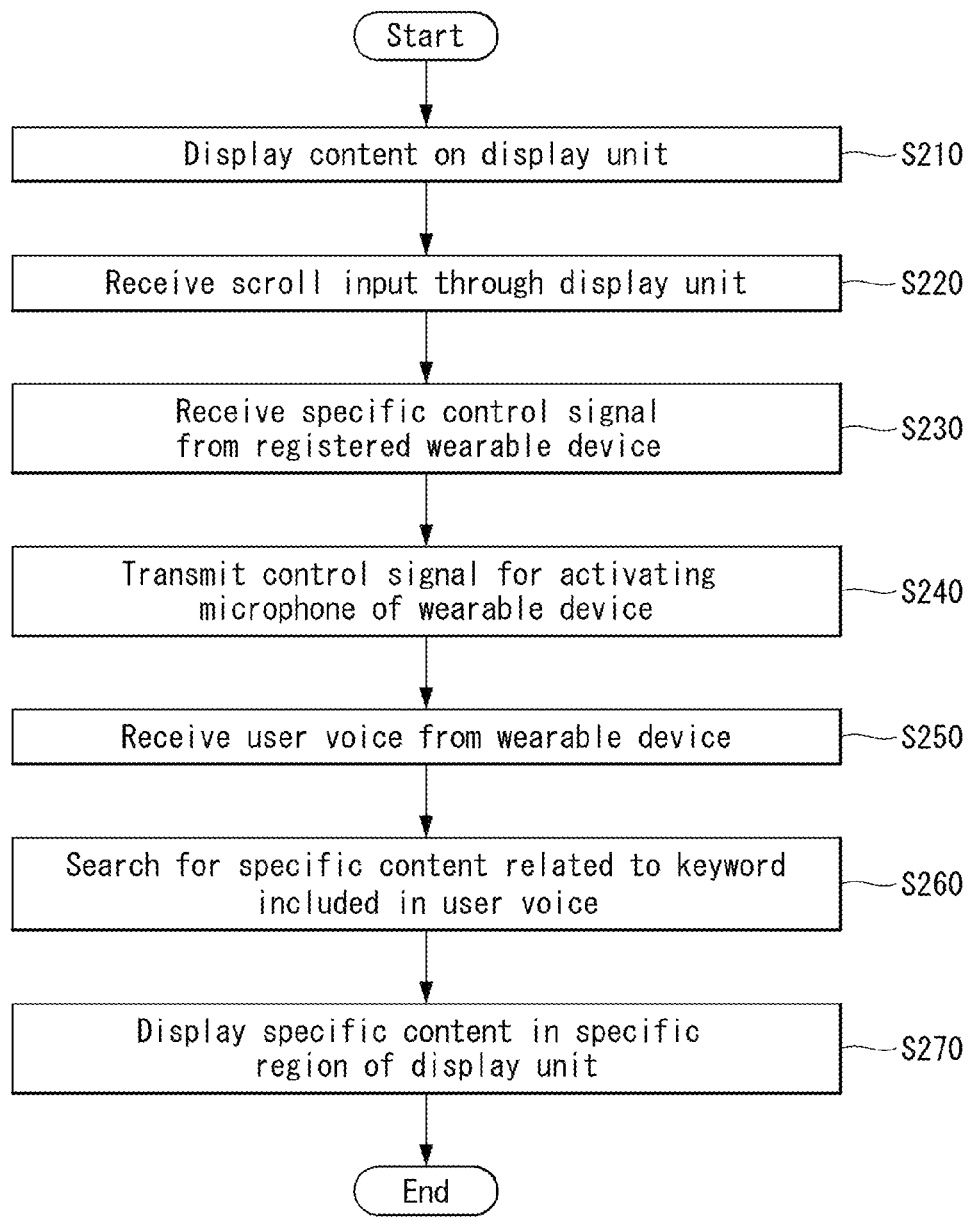
[Figure 12]

[Figure 13]
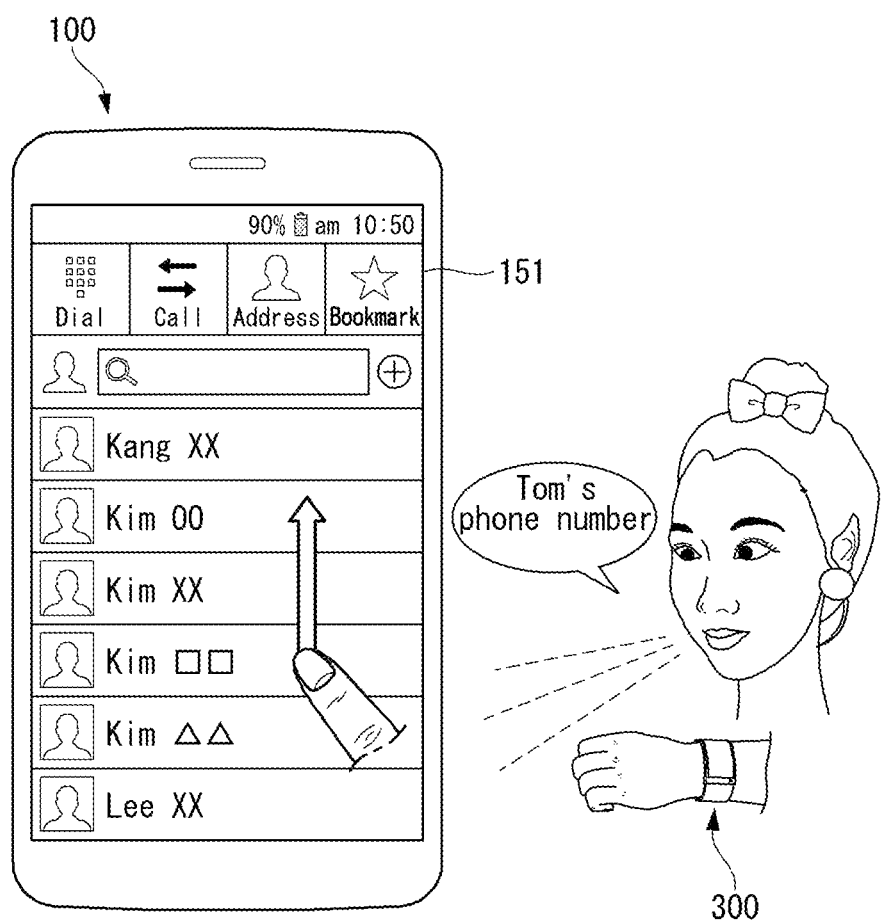

[Figure 14]
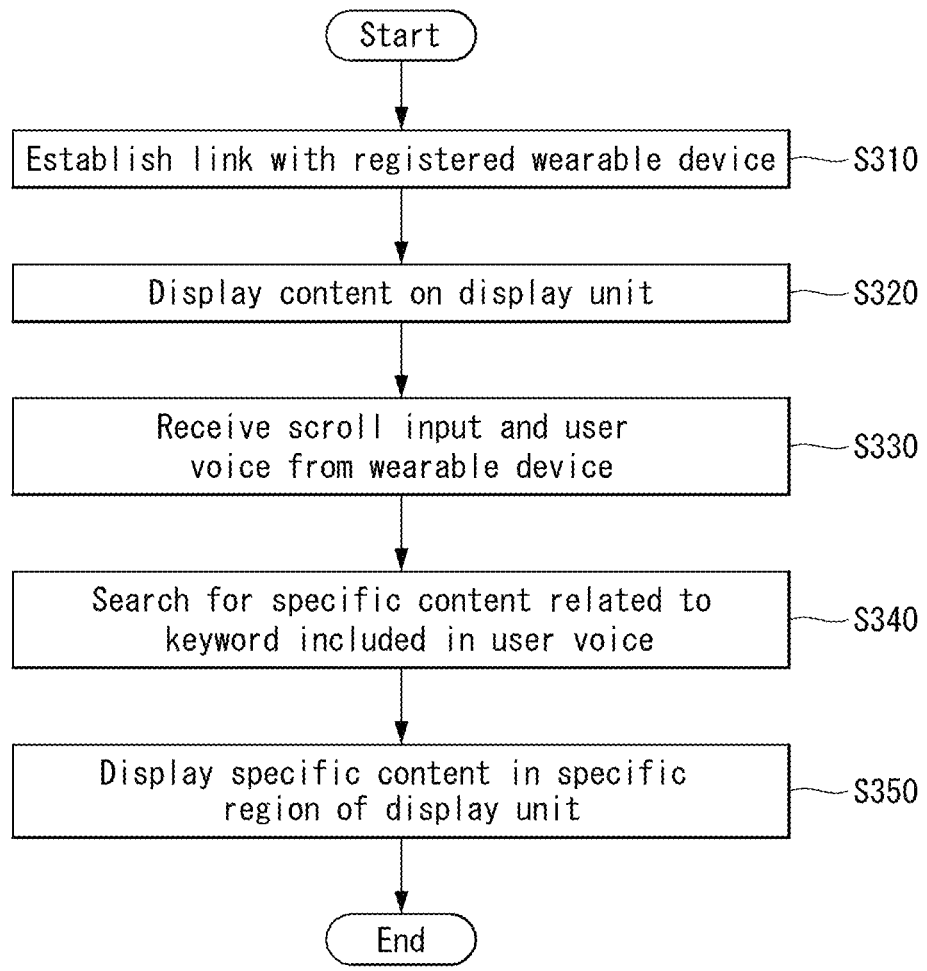

【Figure 15】
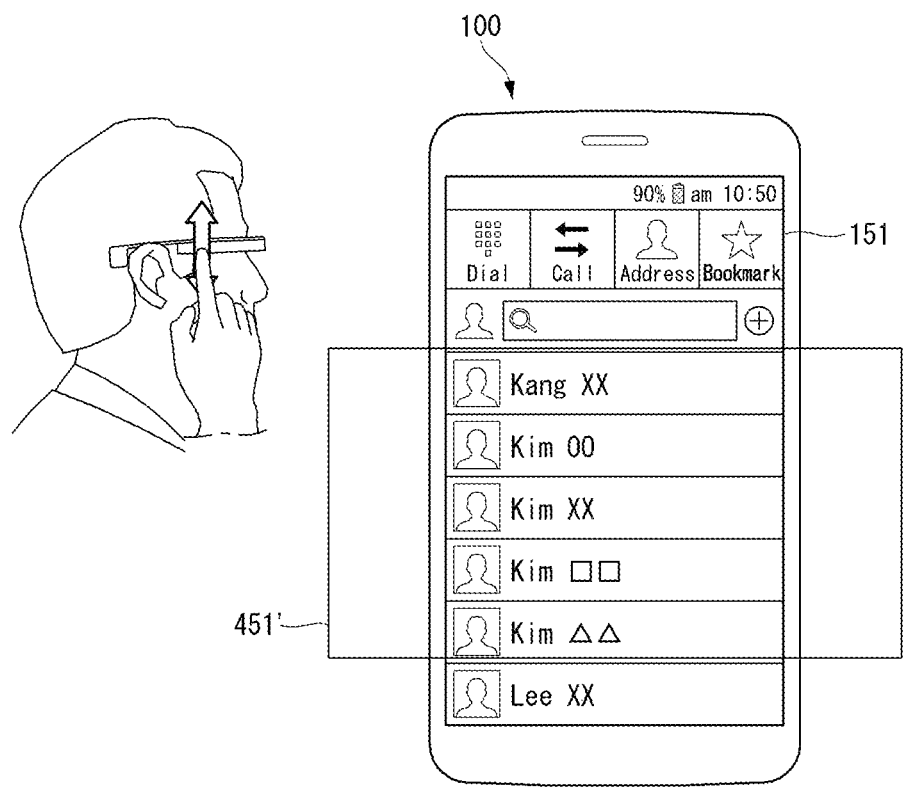

【Figure 16】
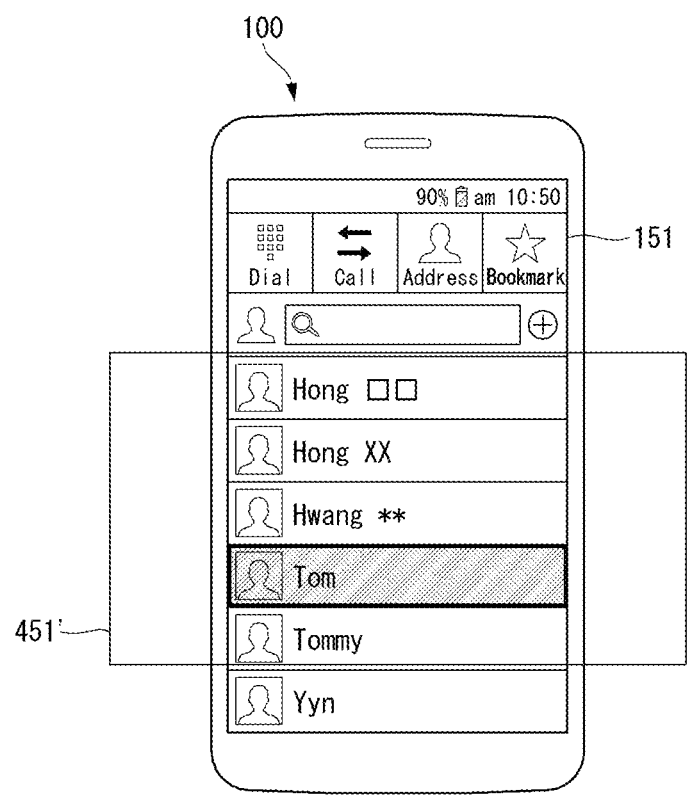

【Figure 17】
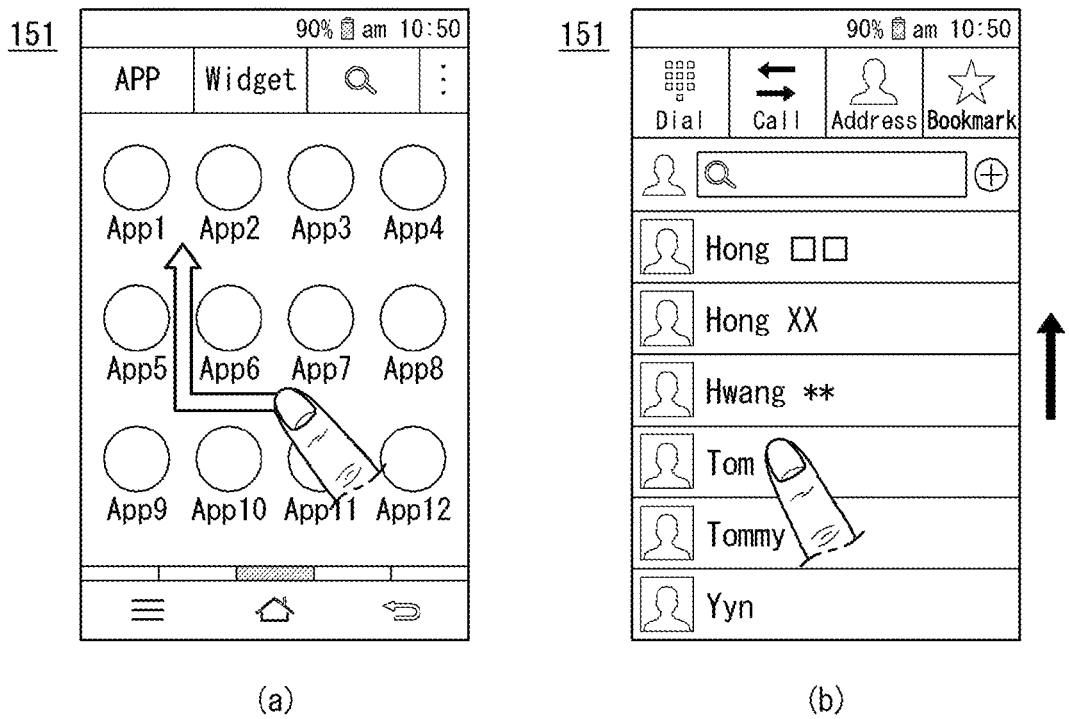
(a)　　　　　　　　(b)

MOBILE TERMINAL AND METHOD FOR
CONTROLLING THE SAME

CROSS-REFERENCE TO RELATED APPLICATIONS

This application is the National Stage filing under 35 U.S.C. 371 of International Application No. PCT/KR2014/012401, filed on Dec. 16, 2014, which claims the benefit of earlier filing date and right of priority to Korean Application No. 10-2014-0075983, filed on Jun. 20, 2014, the contents of which are all hereby incorporated by reference herein in their entirety.

TECHNICAL FIELD

The present invention relates to a mobile terminal for searching content using voice recognition and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Particularly, as terminals become compact, researches on techniques by which users can obtain desired search results rapidly and easily are actively performed.

DISCLOSURE

Technical Problem

An object of the present invention is to solve the aforementioned problem and other problems. Another object of the present invention is to provide a mobile terminal configured to display content on a display unit, to receive a user voice by activating a microphone upon reception of scroll input through the display unit and to search an execution screen of a specific application displayed on the display unit for specific content related to a keyword included in the received user voice, and a method for controlling the same.

Another object of the present invention is to provide a mobile terminal configured to display content, to scroll content included in an execution screen of a specific application according to scroll input upon reception of the scroll input and to search an execution screen of a specific application for specific content related to a keyword included in a user voice, received by activating a microphone of a registered wearable device, upon reception of a specific control signal from the wearable device, and a method for controlling the same.

Technical Solution

According to one aspect of the present invention to accomplish the aforementioned object and other objects, there is provided a mobile terminal, including: a display unit; a microphone; and a controller configured to display content on the display unit, to receive user voice by activating the microphone upon reception of scroll input through the display unit, and to search an execution screen of a specific application displayed on the display unit for specific content related to a keyword included in the received voice.

According to another aspect of the present invention, there is provided a mobile terminal, including: a display unit; and a controller configured to display content on the display unit and to scroll content included in an execution screen of a specific application according to scroll input upon reception of the scroll input through the display unit, wherein, when a specific control signal is received from a registered wearable device, the controller is configured to search an execution screen of a specific application displayed on the display unit for specific content related to a keyword included in a user voice received by activating a microphone of the wearable device.

According to another aspect of the present invention, there is provided a method for controlling a mobile terminal, including: displaying content on a display unit; receiving scroll input through the display unit; receiving a user voice by activating a microphone upon reception of the scroll input; and searching an execution screen of a specific application displayed on the display unit for specific content related to a keyword included in the received user voice.

According to another aspect of the present invention, there is provided a method for controlling a mobile terminal, including: displaying content on a display unit; transmitting a control signal for activating a microphone of a registered wearable device to the wearable device when a specific control signal is received from the wearable device during reception of scroll input through the display unit; receiving, from the wearable device, a user voice received through the microphone; and searching an execution screen of a specific application displayed on the display unit for specific content related to a keyword included in the user voice.

Advantageous Effects

The mobile terminal and the method for controlling the same according to the present invention have the following advantages.

According to at least one embodiment of the present invention, a user can easily search desired information using voice recognition.

In addition, according to at least one embodiment of the present invention, it is possible to save battery power by automatically turning on or off a voice recognition module according to a specific condition.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

The present invention will become more fully understood from the detailed description given herein below and the accompanying drawings, which are given by illustration only, and thus are not limitative of the present invention, and wherein:

FIG. 1a is a block diagram of a mobile terminal in accordance with the present disclosure;

FIGS. 1b and 1c are conceptual views of one example of the mobile terminal, viewed from different directions;

FIG. 2 is a conceptual view of a watch type mobile terminal according to another alternative embodiment of the present disclosure;

FIG. 3 is a conceptual view of a glasses-type mobile terminal according to another alternative embodiment of the present disclosure;

FIG. 4 is a flowchart illustrating a method for controlling a mobile terminal according to a first embodiment of the present invention;

FIGS. 5 to 9 are views for explaining the method for controlling a mobile terminal according to the first embodiment of the present invention;

FIG. 10 is a flowchart illustrating a method for controlling a mobile terminal according to a second embodiment of the present invention;

FIG. 11 is a view for explaining the method for controlling a mobile terminal according to the second embodiment of the present invention;

FIG. 12 is a flowchart illustrating a method for controlling a mobile terminal according to a third embodiment of the present invention;

FIG. 13 is a view for explaining the method for controlling a mobile terminal according to the third embodiment of the present invention;

FIG. 14 is a flowchart illustrating a method for controlling a mobile terminal according to a fourth embodiment of the present invention;

FIGS. 15 and 16 are views for explaining the method for controlling a mobile terminal according to the fourth embodiment of the present invention; and FIG. 17 is a view for explaining a method for controlling a mobile terminal according to a fifth embodiment of the present invention.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being connected with another element, the element can be connected with the other element or intervening elements may also be present. In contrast, when an element is referred to as being directly connected with another element, there are no intervening elements present.

A singular representation may include a plural representation unless it represents a definitely different meaning from the context. Terms such as include or has are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a bio-metric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, smart glasses or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term proximity touch will often be referred to herein to denote the scenario in which a pointer is positioned to be proximate to the touch screen without contacting the touch screen. The term contact touch will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glasses scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an identifying device) may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1*a*). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1*b* illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an array camera. When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

As shown in FIG. 1b, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

FIG. 2 is a perspective view illustrating one example of a watch-type mobile terminal 300 in accordance with another exemplary embodiment. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1a-1c.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro-type, or the like, and include a flexible section or material. The drawing illustrates an example that the fastener 302a is implemented using a buckle.

FIG. 3 is a perspective view illustrating one example of a glasses-type mobile terminal 400 according to another exemplary embodiment. The glasses-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1a-1c.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 3 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glasses-type mobile terminal 400, the display unit 451 may be located to correspond to either or both of the left and right eyes. FIG. 3 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glasses-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Detailed embodiments of the present invention will be described. Description of common functions can be equally applied to embodiments.

FIG. 4 is a flowchart illustrating a method for controlling a mobile terminal according to a first embodiment of the present invention and FIGS. 5 to 9 are views for explaining the method for controlling a mobile terminal according to the first embodiment of the present invention.

Referring to FIG. 4, the controller (180 of FIG. 1a) of the mobile terminal may display content on the display unit (151 of FIG. 1a) (S110) and receive scroll input through the display unit (151 of FIG. 1a) (S120).

Upon reception of the scroll input, the controller (180 of FIG. 1*a*) may receive a user voice by activating the microphone (S130).

Upon reception of the scroll input, the controller can activate the microphone upon determining that the scroll input is a control signal for activating the microphone. When a function corresponding to the scroll input is set, the controller can determine that the scroll input corresponds to a control signal for controlling execution of the corresponding function and a control signal for activating the microphone. When a function corresponding to the scroll input is not set, the controller can determine that the scroll input corresponds to the control signal for activating the microphone.

Content may include various items or information displayed on the mobile terminal, such as icons indicating applications, widgets and information included in an execution screen of a specific application, for example, a telephone number list, a subway linemap, picture thumbnails of a gallery and the like. Scroll input refers to continuous touch input including dragging input, flicking input, swiping input and the like.

When a function corresponding to the received scroll input is set, the controller may execute the function corresponding to the received scroll input and, simultaneously, activate the microphone. For example, when a function of displaying a previous image or next image is set corresponding to scroll input to the left or right and a function of displaying previous content or next content is set corresponding to scroll input upward or downward, the controller can execute the corresponding function and, simultaneously, turn on the microphone upon reception of the corresponding scroll input. Upon reception of scroll input in a diagonal direction or scroll input taking the form of a specific character or figure, the controller can determine the scroll input as a control signal for activating the microphone and turn on the microphone.

Upon activation of the microphone, the controller may display a specific indicator on a status bar or a pop-up window. Here, the status bar refers to a specific region of the display unit, which displays device status information, such as remaining battery capacity of the terminal, reception state and the like, and time information, etc. The controller may display the specific indicator in the form of a pop-up window movable according to touch-and-drag input. Further, the controller may transparently display the specific indicator on an execution screen of a specific application in an overlapping manner.

The controller may search the execution screen of the specific application displayed on the display unit for specific content related to a keyword included in the received user voice (S140).

The controller may analyze the received user voice to extract words and determine a keyword from among the extracted words according to predetermined criteria. For example, a word combined with a postposition can be determined as a keyword when the received user voice is Korean and a noun can be determined as a keyword when the received voice is English.

The controller may display a user interface for confirming the determined keyword or search of the specific content or output a voice for confirming the keyword or search of the specific content.

The controller (180 of FIG. 1*a*) may display the specific content, searched by automatically scrolling the execution screen of the specific application displayed on the display unit, in a specific region of the display unit. The controller may determine a region including the center of the display unit or a region including the center of an area of the specific application execution screen, other than a menu display region thereof, as the specific region. In addition, the controller may determine the uppermost region, left region or right region of the display unit as the specific region according to a method of displaying the execution screen of the specific application.

The controller may control the display unit to automatically increase or decrease a scroll speed of the execution screen of the specific application according to the position of the specific content. Specifically, the controller may automatically control the scroll speed according to a distance between content, which is included in the execution screen of the specific application and currently displayed on the display unit, and the specific content. For example, the controller can control the scroll speed to decrease as the specific content included in the specific application execution screen approaches a specific region of the display unit.

When the specific content is displayed in the specific region of the display unit or the specific content is not searched, the controller may output auditory or tactile feedback to a user. The controller may output different feedbacks when the specific content is searched and displayed in the specific region of the display unit and when the specific content is not searched.

The controller may display the specific content such that display characteristics of the specific content or an outline including the specific content are discriminated from other content included in the execution screen of the specific application. Specifically, the controller may display the specific content such that the thickness, color, outline, contrast, brightness and the like of the specific content are discriminated from other content. When the specific content is not searched, the controller may output visual feedback, such as decreasing brightness of the display unit.

When the controller displays the specific content in the specific region of the display unit, the controller may output a predetermined sound through the audio output module. For example, the predetermined sound may be a first melody, first alarm, output of a representative title of a keyword or specific content through a voice, or the like. When the specific content is not searched, a second melody, second alarm, voice output indicating that no search result exists, or the like may be output.

When the specific content is displayed in the specific region of the display unit, the controller may output first vibration through the haptic module. When the specific content is not searched, the controller may output second vibration. The controller may set generation time and/or generation intervals of the first vibration and the second vibration differently.

When the specific content has been searched, the controller may display the specific content in the specific region of the display unit and display an editing menu with respect to the specific content near the specific region. The editing menu with respect to the specific content may be related to functions of editing the specific content, such as "copy", "delete", "share" and "store".

When scroll input is continuously received through the display unit while the specific content is displayed in the specific region of the display unit, the controller may display a pop-up window for inquiring about whether search of the specific content is cancelled to determine whether to execute a function corresponding to the scroll input according to user's choice.

When a plurality of specific contents including first specific content and second specific content has been searched, the controller may display the first specific content in a specific region of the display unit and additionally display an indicator indicating that specific content items have been searched. For example, the controller can indicate the number of searched content items and the display order of the first specific content displayed in the specific region of the display unit as numbers.

The controller may display a specific screen on which multiple content items are collected and displayed on the execution screen of the specific application in an overlapping manner and display an indicator for guiding display of the specific screen at one side of the display unit. Upon reception of sliding input applied to the indicator, the controller may display the specific screen on the execution screen of the specific application according to the sliding input.

The controller may control the microphone to be deactivated when the specific content has been searched. In addition, the controller may control the microphone to be deactivated when a user voice is not received within a predetermined time.

Accordingly, the controller can automatically turn on or off the microphone according to microphone utilization state, thereby reducing battery power while increasing user convenience.

The method for controlling a mobile terminal according to the first embodiment of the present invention will now be described in detail with reference to FIGS. 5 to 9.

Referring to FIG. 5, the controller (180 of FIG. 1) can display content on the display unit 151. Upon reception of scroll input corresponding to a specific function or scroll input that does not correspond to any function through the display unit 151, the controller can activate the microphone.

Specifically, the controller can display an execution screen of an address directory application or an execution screen of an application management application on the display unit. The controller can display a list of information (e.g., names, phone numbers or the like) of acquaintances, stored in an address directory, on the execution screen of the address-book application upon execution of the address directory application. The controller can display icons corresponding applications or widgets installed in the terminal on the execution screen of the application management application upon execution of the application management application.

The controller can activate the microphone while vertically scrolling address directory information upon reception of scroll input in the vertical direction, applied to the execution screen of the address directory application (FIG. 5(a)). Upon reception of scroll input in the horizontal direction, applied to the execution screen of the address directory application, the controller can activate the microphone without scrolling the address directory information (FIG. 5(b)).

Upon reception of horizontal scroll input applied to the execution screen of the application management application, the controller can activate the microphone while moving the screen on which application icons are displayed to the left or right (FIG. 5(c)). Upon reception of vertical scroll input applied to the execution screen of the application management application, the controller can activate the microphone without scrolling the screen on which application icons are displayed (FIG. 5(d)).

Referring to FIG. 6, the controller (180 of FIG. 1a) can output feedback to a user upon automatic activation of the microphone.

The controller can output visual feedback upon automatic activation of the microphone according to scroll input. Specifically, the controller can display an indicator id on a status bar (FIG. 6(a)) or on a pop-up window F (FIG. 6(b)). Here, the indicator may be an icon or pop-up content including at least one of a figure, character and symbol.

The controller can output tactile or auditory feedback upon automatic activation of the microphone according to scroll input. Specifically, the controller can output predetermined vibration through the haptic module (FIG. 6(c)) or output a predetermined sound (FIG. 6(d)). The controller can simultaneously output two or more of visual, auditory and tactile feedbacks.

Referring to FIG. 7, the controller (180 of FIG. 1a) can receive a user voice through the microphone, extract a keyword included in the received voice and notify the user of the extracted keyword in various manners.

The controller may display a pop-up window with respect to the icon id displayed on the status bar to indicate activation of the microphone (FIG. 7(a)) or display a keyword "Tom" on the pop-up window F indicating activation of the microphone (FIG. 7(b)).

Alternatively, the controller may display the keyword "Tom" on an address search window IW and output vibration through the haptic module (FIG. 7(c)) or output the keyword "Tom" as voice through the audio output module (FIG. 7(d)).

Referring to FIG. 8, the controller (180 of FIG. 1a) can search an execution screen of a specific application for specific content related to the keyword and output search results using at least one of visual, tactile and auditory feedbacks.

The controller can display the specific content related to the keyword in a specific region of the display unit in such a manner that display characteristics of the specific content are discriminated form other content (FIG. 8(a)). Specifically, the controller can display the specific content in a region including the center of the execution screen of the address directory application, other than a menu display region thereof, brighter or darker than other regions.

The controller can display the specific content related to the keyword in the specific region of the display unit and output vibration through the haptic module (FIG. 8(b)).

The controller can display the specific content in the specific region of the display unit and output a search result such as "Tom has been searched" as a voice through the audio output module (FIG. 8(c)).

When a plurality of specific content items related to the keyword has been searched, the controller can display first specific content in the specific region of the display unit and indicate the number of searched specific content items using an indicator. For example, when three phone numbers corresponding to "Tom" has been searched, the controller can display all search results and indicate the orders of content items displayed on the display unit as numbers. In addition, when the specific content is searched before or after a plurality of content items is displayed, the controller can display the specific content using an indicator such as an arrow.

Referring to FIG. 9, when a plurality of specific content items has been searched, the controller (180 of FIG. 1a) can display an indicator indicating that the content items have been searched, display a menu for editing the searched specific content items or display a specific screen on which the specific content items are collected and displayed.

When multiple specific content items have been searched, the controller can display an indicator for indicating the number of searched content items and the order of each searched content item near each searched content item. Furthermore, the controller can discriminate specific content from other content by displaying an outline including the specific content (FIG. 9(a)).

When the multiple specific content items have been searched, the controller can change content display order and display the searched content items in the upper region of the display unit (FIG. 9(b)).

When the multiple specific content items have been searched, the controller can display the indicator for indicating the number of searched content items and the order of each searched content item near each searched content item and display a menu W for editing specific content (FIG. 9(c)). Upon reception of input applied to the menu W, the controller can align the specific content items in a specific region of the display unit or move the specific content items to a specific folder.

The controller can display the specific screen S, on which the multiple specific content items are collected and displayed, on an execution screen of a specific application in an overlapping manner in an overlapping manner and display an indicator Si for guiding display of the specific screen at one side of the display unit. Upon reception of sliding input applied to the indicator Si, the controller can display the specific screen S on the execution screen of the specific application according to the sliding input.

FIG. 10 is a flowchart illustrating a method for controlling a mobile terminal according to a second embodiment of the present invention and FIG. 11 is a view for explaining the method for controlling a mobile terminal according to the second embodiment of the present invention.

Referring to FIG. 10, the controller (180 of FIG. 1a) may receive scroll input through the display unit (151 of FIG. 1a) (S120) and then acquire a gaze direction of a user through the camera (121 of FIG. 1a) (S122).

Subsequently, the controller (180 of FIG. 1a) may determine whether the acquired gaze direction is opposite to the scroll direction (S124) and activate the microphone when the gaze direction is opposite to the scroll direction (Yes). When the gaze direction corresponds to the scroll direction (No), the controller (180 of FIG, 1a) may acquire a new gaze direction through the camera at a predetermined interval without activating the microphone (S122). In this case, the controller can determine activation of the microphone in consideration of a gaze direction acquired through the camera in addition to the scroll input.

Referring to FIG. 11, the controller (180 of FIG. 1a) can receive upward scroll input and, simultaneously acquire a gaze direction of a user through the camera 121. When the gaze direction of the user is opposite to the scroll direction, the controller can activate the microphone.

That is, since the gaze direction of the user, opposite to the scroll direction, can be considered to be user's intention to search scrolled content for specific content, the controller can activate the microphone in further consideration of the gaze direction of the user in order to prevent wrong operation that does not correspond to the scroll input for searching for the specific content.

FIG. 12 is a flowchart illustrating a method for controlling a mobile terminal according to a third embodiment of the present invention and FIG. 13 is a view for explaining the method for controlling a mobile terminal according to the third embodiment of the present invention.

Referring to FIG. 12, the controller (180 of FIG. 1a) of the mobile terminal may display content on the display unit (151 of FIG. 1a) (S210) and receive scroll input through the display unit (151 of FIG. 1a) (S220).

Steps S210 and S220 correspond to those of the first embodiment of the present invention and thus detailed description thereof is omitted.

The controller (180 of FIG. 1a) may receive a specific control signal from a registered wearable device during reception of the scroll input (S230) and transmit a control signal for activating a microphone of the wearable device (S240).

The controller (180 of FIG. 1a) of the mobile terminal may register a wearable device including at least one of the watch-type mobile terminal (300 of FIG. 2) or glasses-type mobile terminal (400 of FIG. 3) and receive a specific control signal from a specific wearable device from among the registered wearable devices. A description will be given of the watch-type mobile terminal as the specific wearable device.

Specifically, upon detection of proximity sensing information from the watch-type mobile terminal, the controller may receive a specific control signal indicating proximity sensing and transmit a control signal for requesting microphone activation to the watch-type mobile terminal.

The controller may receive a user voice, received through the microphone of the wearable device, from the wearable device (S250).

Specifically, the controller may operate in connection with the watch-type mobile terminal to control the watch-type mobile terminal to activate the microphone thereof when the watch-type mobile terminal approaches the user, receive a user voice, received through the microphone, and extract a keyword from the received user voice. That is, microphone activation and voice reception can be performed by controlling the watch-type mobile terminal (second mobile terminal) and generation of the control signal for activating the microphone and search of specific content using the received user voice can be performed by the controller of the mobile terminal (first mobile terminal).

Upon activation of the microphone of the second mobile terminal, user feedback for indicating microphone activation may be output to at least one of the first mobile terminal and the second mobile terminal. The user feedback can include at least one of visual, auditory and tactile feedbacks.

The controller may search an execution screen of a specific application displayed on the display unit for specific content related to the keyword included in the received voice (S260) and display the specific content in a specific region of the display unit (S270).

The controller may analyze the received voice to extract words and determine the keyword from among the extracted words according to predetermined criteria. For example, the controller can determine a word combined with a post position as a keyword when the received voice is Korean and determine a noun as a keyword when the received voice is English.

The controller may display a user interface for confirming the extracted keyword and search of the specific content or output voice for confirming the keyword or search of the specific content.

The controller (180 of FIG. 1a) may automatically scroll the execution screen of the specific application displayed on the display unit and display searched specific content in a specific region of the display unit. The controller may determine a region including the center of the display unit or a region including the center of an area of the execution screen of the specific application, other than a menu display region thereof, as the specific region. In addition, the controller may determine the uppermost region, left or right region of the display unit as the specific region according to a method of displaying the execution screen of the specific application.

The controller may control the display unit to automatically increase or decrease a scroll speed of the execution screen of the specific application according to the position of the specific content. Specifically, the controller may automatically control the scroll speed according to a distance between content, which is included in the execution screen of the specific application and currently displayed on the display unit, and the specific content. For example, the controller can control the scroll speed to decrease as the specific content included in the specific application execution screen approaches a specific region of the display unit.

When the specific content is displayed in the specific region of the display unit or the specific content is not searched, the controller may output auditory or tactile feedback to a user. The controller may output different feedbacks when the specific content is searched and displayed in the specific region of the display unit and when the specific content is not searched.

The controller may control only the second mobile terminal to output the user feedback. Alternatively, the controller may control the first mobile terminal and the second mobile terminal to simultaneously output the user feedback.

The controller may display the specific content such that display characteristics of the specific content or an outline including the specific content are discriminated from other content included in the execution screen of the specific application. Specifically, the controller may display the specific content such that the thickness, color, outline, contrast, brightness and the like of the specific content are discriminated from other content. When the specific content is not searched, the controller may output visual feedback, such as decreasing brightness of the display unit.

When the controller displays the specific content in the specific region of the display unit, the controller may output a predetermined sound through the audio output module. For example, the predetermined sound may be a first melody, first alarm, output of a representative title of a keyword or specific content through a voice, or the like. When the specific content is not searched, a second melody, second alarm, voice output indicating that no search result exists, or the like may be output.

When the specific content is displayed in the specific region of the display unit, the controller may output first vibration through the haptic module. When the specific content is not searched, the controller may output second vibration. The controller may set generation time and/or generation intervals of the first vibration and the second vibration differently.

When the specific content has been searched, the controller may display the specific content in the specific region of the display unit and display an editing menu with respect to the specific content near the specific region. The editing menu with respect to the specific content may be related to functions of editing the specific content, such as "copy", "delete", "share" and "store".

When scroll input is continuously received through the display unit while the specific content is displayed in the specific region of the display unit, the controller may display a pop-up window for inquiring about whether search of the specific content is cancelled to determine whether to execute a function corresponding to the scroll input according to user's choice.

When a plurality of specific contents including first specific content and second specific content has been searched, the controller may display the first specific content in a specific region of the display unit and additionally display an indicator indicating that specific content items have been searched. For example, the controller can indicate the number of searched content items and the display order of the first specific content displayed in the specific region of the display unit as numbers.

The controller may display a specific screen on which multiple content items are collected and displayed on the execution screen of the specific application in an overlapping manner and display an indicator for guiding display of the specific screen at one side of the display unit. Upon reception of sliding input applied to the indicator, the controller may display the specific screen on the execution screen of the specific application according to the sliding input.

The controller may control the microphone to be deactivated when the specific content has been searched. In addition, the controller may control the microphone to be deactivated when a user voice is not received within a predetermined time.

Accordingly, the controller can automatically turn on or off the microphone according to microphone utilization state, thereby reducing battery power while increasing user convenience.

Referring to FIG. 13, upon reception of scroll input through the display unit 151 of the first mobile terminal 100 and reception of a proximity sensing signal of the second mobile terminal 300, the controller (180 of FIG. 1a) can control the second mobile terminal 300 to activate the microphone thereof.

The controller of the second mobile terminal 300 can activate the microphone according to a control signal received from the controller of the first mobile terminal 100, receive a user voice through the microphone and transmit the received user voice to the first mobile terminal 100.

The controller of the second mobile terminal 300 can transmit the received user voice to the first mobile terminal 100 only at least one of a case in which the user voice received through the microphone exceeds a predetermined decibel and a case in which voice having a predetermined waveform is received. When unintended noise is received through the microphone, the controller of the second mobile terminal 300 can set restriction conditions such that the noise is not transmitted to the first mobile terminal.

The controller of the first mobile terminal 100 can extract a keyword from the received user voice and search an execution screen of a specific application displayed on the display unit for specific content related to the extracted keyword.

FIG. 14 is a flowchart illustrating a method for controlling a mobile terminal according to a fourth embodiment of the present invention and FIGS. 15 and 16 are views for describing the method for controlling a mobile terminal according to the fourth embodiment of the present invention.

Referring to FIG. 14, the controller (180 of FIG. 1a) may establish a communication link with a registered wearable device (S310) and display content on the display unit (S320).

Specifically, the controller of the first mobile terminal may establish a communication link with a specific wearable device from among registered multiple wearable devices and display content on the display unit of the first mobile terminal. Here, at least part of the content, displayed on the display unit of the first mobile terminal, may be displayed on the display unit of the second mobile terminal with which the communication link has been established.

When the controller (180 of FIG. 1*a*) of the first mobile terminal receives scroll input and user voice through the second mobile terminal while at least part of the content, displayed on the display unit of the first mobile terminal, is displayed on the display unit of the second mobile terminal (S330), the controller of the first mobile terminal may search for specific content related to a keyword included in the received user voice (S340).

The controller of the second mobile terminal may maintain the microphone in an activated state all the time or activate the microphone upon reception of scroll input through the input unit of the second mobile terminal.

The controller (180 of FIG. 1*a*) of the first mobile terminal may display the specific content in a specific region of the display unit of the first mobile terminal (S350). Here, the controller of the second mobile terminal may display the specific content, displayed in the specific region of the display unit of the first mobile terminal, according to the direction of the second mobile terminal. The controller of the second mobile terminal may control the specific content, displayed in the specific region of the display unit of the first mobile terminal, to be simultaneously displayed on the display unit of the second mobile terminal regardless of the direction of the second mobile terminal.

While the method for outputting specific content search results through visual feedback has been described, the controller of the first mobile terminal may output the specific content search results through at least one of the first mobile terminal and the second mobile terminal using at least one of visual, tactile and auditory feedbacks.

FIG. 17 is a view for describing a method for controlling a mobile terminal according to a fifth embodiment of the present invention.

Referring to FIG. 17, the controller (180 of FIG. 1*a*) of the mobile terminal can display content on the display unit (151 of FIG. 1*a*) and receive specific scroll input through the display unit (151 of FIG. 1*a*). Here, the specific scroll input refers to scroll input that does not correspond to any function. For example, when scroll input to the left or right is set corresponding to a function of moving to a left or right page, the scroll input to the left is not specific scroll input, but scroll input that does not corresponding to any function, such as scroll input in the form of """⌐""" or """⌊""" refers to specific scroll input (FIG. 17(*a*)).

Upon reception of specific scroll input, the controller (180 of FIG. 1*a*) can receive a user voice by activating the microphone.

Upon reception of scroll input, the controller can activate the microphone upon determining that the scroll input is a control signal for activating the microphone. When a function corresponding to the scroll input is set, the controller can determine that the scroll input corresponds to a control signal for controlling execution of the function and a control signal for activating the microphone. When a function corresponding to the scroll input is not set, the controller can determine that the scroll input is the control signal for activating the microphone.

Content may include various items or information displayed on the mobile terminal, such as icons indicating applications, widgets, information included in an execution screen of a specific application, for example, a telephone number list, a subway linemap, photo thumbnails of a gallery and the like.

The controller can search an execution screen of a specific application displayed on the display unit for content corresponding to a voice command input by activating the microphone. The controller can display specific content, searched by automatically scrolling the execution screen of the specific application, in a specific region of the display unit. When a user discovers content that the user wants to search during automatic scrolling of the execution screen of the specific application, the controller can stop the automatic scroll function when the user touches the content (FIG. 17(*b*)).

According to the present invention, it is possible to receive a user voice by activating the microphone, scroll an execution screen of a specific application to search for specific content, and stop the automatic scroll function when the user discovers specific content during automatic scrolling and touches the specific content.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:
1. A mobile terminal, comprising:
a display unit;
a microphone; and
a controller configured to:
cause the display unit to display an execution screen of a specific application including at least one content;
determine whether a function corresponding to a scroll input is set when the scroll input is received through the display unit based on whether the scroll input is a first type corresponding to a control signal for activating the microphone or second type corresponding to the control signal for activating the microphone and a control signal for controlling execution of the corresponding function;

activate the microphone without executing the function in response to the scroll input when the function is not set;

execute the corresponding function and activate the microphone in response to the scroll input when the function is set;

receive a user voice through the activated microphone; and search for a specific content related to a keyword included in the received user voice from the execution screen of the specific application displayed on the display unit.

2. The mobile terminal of claim 1, wherein the controller is further configured to cause the display unit to display the specific content in a specific region thereof by automatically scrolling the execution screen of the specific application displayed on the display unit.

3. The mobile terminal of claim 1, wherein the controller is further configured to cause the display unit to display the specific content such that the specific content or an outline including the specific content is discriminated from other content when the specific content is displayed in a specific region of the display unit.

4. The mobile terminal of claim 1, further comprising an audio output unit, wherein the controller is further configured to cause the audio output unit to output a predetermined sound when the specific content is displayed in a specific region of the display unit.

5. The mobile terminal of claim 1, further comprising a haptic module, wherein the controller is further configured to cause the haptic module to output vibration when the specific content is displayed in a specific region of the display unit.

6. The mobile terminal of claim 1, wherein the controller is further configured to determine a keyword from among words included in the user voice according to predetermined criteria.

7. The mobile terminal of claim 1, further comprising a camera, wherein the controller is further configured to acquire a gaze direction of a user through the camera and to activate the microphone when the acquired gaze direction is opposite to a scroll direction of the content.

8. The mobile terminal of claim 1, wherein the controller is further configured to cause the display unit to:

display a first specific content in a specific region of the display unit, and an indicator for guiding sliding input at one side of the display unit, when a plurality of specific content items has been searched; and display a specific screen on which the specific content items are collected and displayed on the execution screen of the specific application in an overlapping manner, when a sliding input is applied to the indicator.

9. The mobile terminal of claim 1, wherein the controller is further configured to cause the display unit to automatically increase or decrease a scroll speed of the execution screen of the specific application according to a position of the specific content in such a manner that the scroll speed decreases as the specific content approaches a specific region of the display unit.

10. The mobile terminal of claim 1, wherein the controller is further configured to cause the display unit to display a user interface for confirming search of the specific content related to the keyword or to output a voice for confirming search of the specific content related to the keyword.

11. The mobile terminal of claim 1, wherein the controller is further configured to cause the display unit to display a menu for editing the specific content as a pop-up window when the specific content has been searched.

12. The mobile terminal of claim 1, wherein the controller is further configured to cause output of a predetermined sound or a vibration feedback when the specific content is not searched.

13. The mobile terminal of claim 1, wherein the controller is further configured to control the microphone to be deactivated when the specific content has been searched or when a user voice is not received within a predetermined time.

14. The mobile terminal of claim 1, wherein the controller is further configured to cause the display unit to display a specific indicator on a status bar or a pop-up window when the microphone is activated.

15. The mobile terminal of claim 1, wherein the controller is further configured to search the execution screen of the specific application displayed on the display unit for a specific content related to a keyword included in a user voice received by activating a microphone of a wearable device when a specific control signal is received from a registered wearable device.

16. The mobile terminal of claim 15, wherein the wearable device transmits the user voice to the mobile terminal when the user voice received through the microphone of the wearable device exceeds a predetermined decibel.

17. A method for controlling a mobile terminal, comprising:

displaying an execution screen of a specific application including at least one content on a display unit;

receiving a scroll input through the display unit;

determining whether a function corresponding to the scroll input is set when the scroll input is received based on whether the scroll input is a first type corresponding to a control signal for activating the microphone or second type corresponding to the control signal for activating the microphone and a control signal for controlling execution of the corresponding function;

activating a microphone without executing the function in response to the scroll input when the function is not set;

executing the corresponding function and activating the microphone in response to the scroll input when the function is set;

receiving a user voice through the activated microphone; and searching for a specific content related to a keyword included in the received user voice from the execution screen of the specific application displayed on the display unit.

* * * * *